April 17, 1951     H. M. DODGE     2,549,581

WIRE REINFORCED WINDOW CHANNEL

Filed Sept. 22, 1948

INVENTOR
Howard M. Dodge
BY Evans & McCoy
ATTORNEYS

Patented Apr. 17, 1951

2,549,581

UNITED STATES PATENT OFFICE 2,549,581

WIRE REINFORCED WINDOW CHANNEL

Howard M. Dodge, Wabash, Ind., assignor to The General Tire and Rubber Company, Akron, Ohio, a corporation of Ohio Application September 22, 1948, Serial No. 50,450

5 Claims. (Cl. 296—44.5)

This invention relates to window channels such as are used as guide ways for the slidable glass panes in windows of motor vehicles and has for its object to provide a wire reinforced window channel so constructed that it can be easily bent substantially without distortion to conform to the window openings in which it is placed and to the corners of the slidable panes mounted in such windows.

The invention also has for its object to provide a window channel of the character specified which is of light weight durable construction and inexpensive to manufacture.

With the above and other objects in view the invention may be said to comprise the window channel as illustrated in accompanying drawings and hereinafter described, together with such variations and modifications thereof that will be apparent to one skilled in the art to which the invention pertains.

Reference should be had to the accompanying drawings forming a part of this specification in which.

Figure 1:
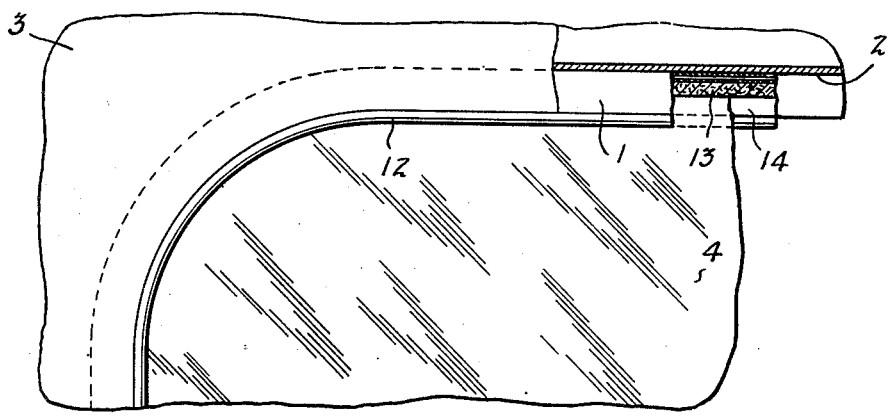
Figure 1 is a fragmentary side elevation of a portion of a window in which the channel is mounted.

In Fig. 1 of the accompanying drawings, window channel of the present invention is shown applied to a motor vehicle window, the channel 1 being bent to conform to the window receiving groove 2 of a frame 3 which is shaped to conform to the corners of a slidable window pane 4.

Figure 3:
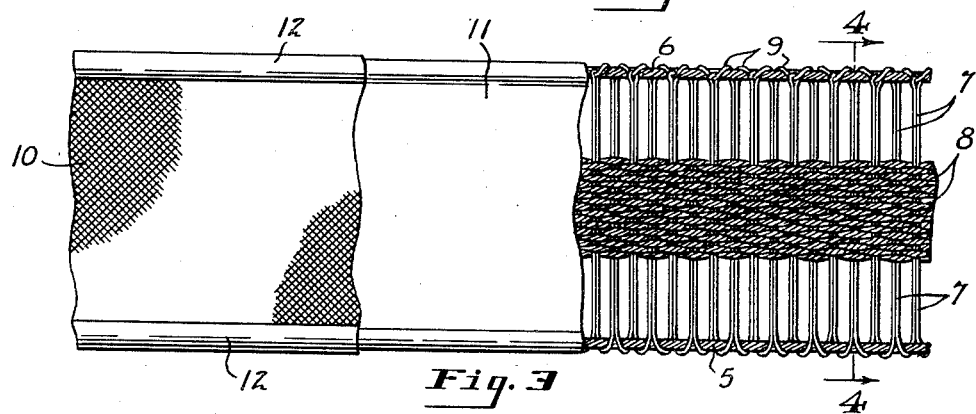
Fig. 3 is a plan view of the strip from which the window channel is formed, portions being broken away to show the woven body and the rubber friction coat as well as the exterior fabric covering.
Figure 4:
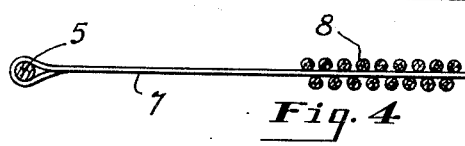
Fig. 4 is a transverse section taken on the line indicated at 4—4 in Fig. 3 showing the woven body on an enlarged scale.

As shown in Figs. 3 and 4 the window channel of the present invention has a body in the form of a woven strip which has longitudinal strands 5 and 6 along opposite edges, weft strands 7 extending across the space between the strands 5 and 6 and closely spaced warp strands 8 which are confined to the central portion of the strip which forms the bottom of the channel. The edge strands 5 and 6 are preferably of a diameter considerably greater than the weft strands 7 and may be cord of textile material or metal wire.

The strands 7 extend back and forth between the edge strand 6 in closely spaced relation and are disposed at substantially right angles to the strands 5 and 6. The weft strands 7 are preferably formed by a fine metal strand such as steel wire, that is looped over the strands 5 and bent back upon itself adjacent the strands 6. The strand 7 has loops adjacent the edge strand 6 that are disposed alternately on opposite sides of the strand 6 and secured together by a tie strand 9 that passes through the loops and over the strand 6 to retain the same.

Figure 5:
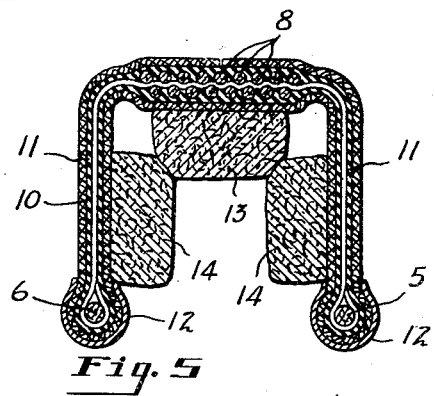
Fig. 5 is a transverse section through the finished window channel showing the same on an enlarged scale.

The warp strands 8 are preferably textile cord such as cotton which are interwoven with the transverse weft strands 7 throughout the length of the strip. As shown in Fig. 5 the strands 8 are closely spaced throughout the major portion of the width of the channel bottom and serve to limit elongation of the bottom of the channel when the channel is bent.

The center portion of the tape in which the warp strands 8 are located is impregnated by suitable means such as calendering or dipping with a vulcanizable rubber composition or with a suitable heat hardenable plastic such as one of the well known vinyl plastics to provide a channel bottom that has the transverse rigidity necessary to resist distortion when the channel is bent. A cloth strip 10 of a width to cover the woven body of the tape is secured to said woven body by a layer 11 of adhesive material. The adhesive material forming the layer 11 may be the rubber or plastic previously applied to the tape or may be applied to a face of the cloth strip prior to application of the cloth strip to the woven body.

The edges of the strip are provided with bendable metal beads 12 which are in the form of steel channels receiving the edge strands 5 and 6. The channels 12 are crimped over the edges of the channel and provide a bead structure permitting a crowding together of the weft strand 7 when the channel is bent to arcuate form as shown in Fig. 1. When the edge strands 5 and 6 are formed of strands twisted together tension will be released upon the bending of the channel and the weft strands 7 can readily adjust themselves in the curved portion of the channel without distortion of the walls of the channel.

Figure 2:
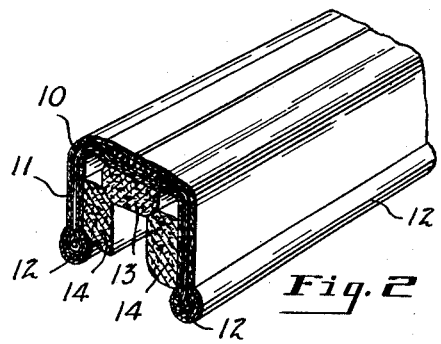
Fig. 2 is a sectional perspective view of the bendable window channel.

The strip shown in Fig. 3 is bent along longitudinal lines to the channel shape shown in Figs. 2 and 5 and suitable cushioning material is secured to the interior of the channel to receive the glass pane. As herein shown a felt strip 13 is secured to the bottom of the channel and strips 14 of felt are secured to the inner faces of the side walls.

It is to be understood that in accordance with the provisions of the patent statutes variations and modifications of the specific devices herein shown and described for purposes of illustration may be made without departing from the invention.

What I claim is:

1. A bendable window channel comprising a woven body in the form of a strip bent along longitudinal lines to channel shape and having a longitudinal strand along each of its edges, closely spaced wire weft strands connecting said edge strands and warp strands interwoven with said weft strands in the bottom portion of the channel only, a fabric covering adhesively secured to said woven body, and bendable hollow longitudinal bead members secured to the edges of said channel and receiving said edge strands.

2. A bendable window channel comprising a woven body in the form of a strip bent along longitudinal lines to channel shape and having a longitudinal strand along each of its edges, closely spaced wire weft strands extending back and forth between said edge strands and warp strands interwoven with said weft strands in the bottom portion of the channel only, a coating of rubber covering said woven body, a fabric covering adhered to said rubber coating and hollow longitudinal resilient metal bead members receiving said edge strands.

3. A bendable window channel comprising a woven body in the form of a strip bent along longitudinal lines to channel shape and having a longitudinal strand along each of its edges, wire weft strands closely spaced and disposed at substantially right angles to said edge strands, closely spaced warp strands of textile material interwoven with said weft strands in the bottom portion of the channel only and across the major portion of the width of said bottom portion, a fabric covering adhesively secured to said woven body, and bendable metal bead of channel form crimped over said edge strands.

4. A bendable window channel comprising a woven body in the form of a strip bent along longitudinal lines to channel shape and having a longitudinal strand along each of its edges, wire weft strands closely spaced and disposed at substantially right angles to said edge strands, closely spaced warp strands of textile material interwoven with said weft strands in the bottom portion of the channel only and across the major portion of the width of said bottom portion, a fabric covering adhesively secured to said woven body, pads secured to the inner faces of the sides and bottom of the channel, and bendable metal beads of channel form crimped over said edge strands.

5. A bendable window channel comprising a woven body in the form of a strip bent along longitudinal lines to channel shape and having longitudinal edge strands, metal weft strands connecting said edge strands, extending at substantially right angles thereto and closely spaced throughout the length of the body, and warp strands of textile material interwoven with said weft strands in the bottom portion only of the channel, said warp strands being closely spaced throughout the major portion of the width of said bottom portion, a friction coat of rubber on said woven body, a fabric covering adhered to said friction coat, and channel shaped steel bead strips crimped upon said edge strands.

HOWARD M. DODGE.

REFERENCES CITED

The following references are of record in the file of this patent:

UNITED STATES PATENTS

| Number | Name | Date |
|---|---|---|
| 2,142,258 | Schlegel | Jan. 3, 1939 |
| 2,169,792 | Dean | Aug. 15, 1939 |
| 2,204,630 | Spraragen | June 18, 1940 |